(No Model.)  2 Sheets—Sheet 2.

R. M. HUNTER.
APPARATUS FOR AGING FABRICS.

No. 580,317.  Patented Apr. 6, 1897.

Attest
R. M. Kelly,
J. J. Boyle

Inventor

UNITED STATES PATENT OFFICE.

RUDOLPH M. HUNTER, OF PHILADELPHIA, PENNSYLVANIA, ASSIGNOR TO THE H. W. BUTTERWORTH & SONS COMPANY, OF PENNSYLVANIA.

APPARATUS FOR AGING FABRICS.

SPECIFICATION forming part of Letters Patent No. 580,317, dated April 6, 1897.

Application filed November 4, 1896. Serial No. 611,066. (No model.)

*To all whom it may concern:*

Be it known that I, RUDOLPH M. HUNTER, of the city and county of Philadelphia and State of Pennsylvania, have invented an Improvement in Apparatus for Steaming, Aging, and Drying Fabrics, of which the following is a specification.

My invention has reference to improvements in apparatus for steaming, aging, and drying fabrics; and it consists of certain improvements, which are fully set forth in the following specification and shown in the acpanying drawings, which form a part thereof.

This application (Case No. 292) comprehends more specifically certain features for automatically feeding the supporting-rods upon which the fabric is looped through suitable guides.

In carrying out my invention I employ conveyer devices moving through a chamber in which the operation takes place and combine therewith feeding devices for the fabric to lower it into the chamber, supporting-rods for supporting the fabric in loops and adapted to be transferred successively by the conveyer, and automatic feeding devices for feeding the rods horizontally through a suitable guide.

The feeding devices consist more particularly in a pivoted pusher adapted to reciprocate, a spring or weight to move it in one direction, an eccentric to move it in the opposite direction, and a loose connection between the eccentric and pusher, whereby the pusher is operated only at intervals of time.

My invention will be better understood by reference to the accompanying drawings, in which—

Figure 1:
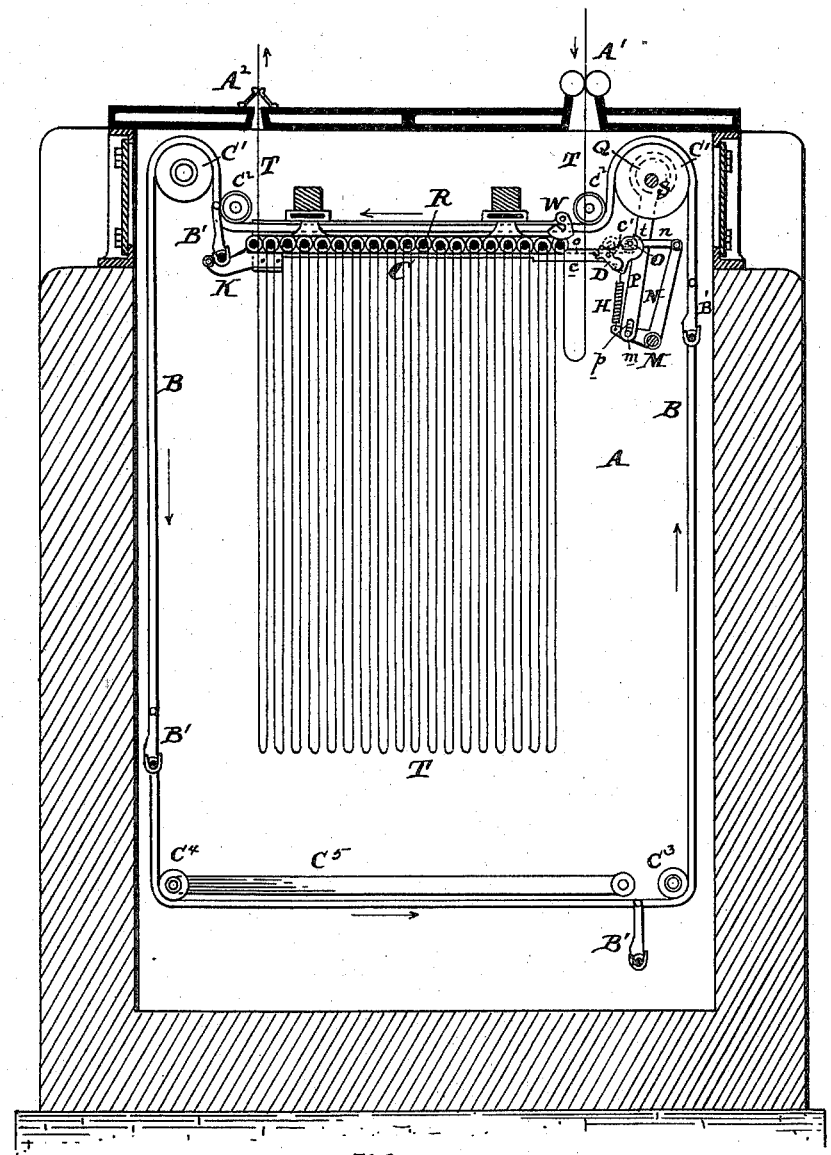
Figure 2:
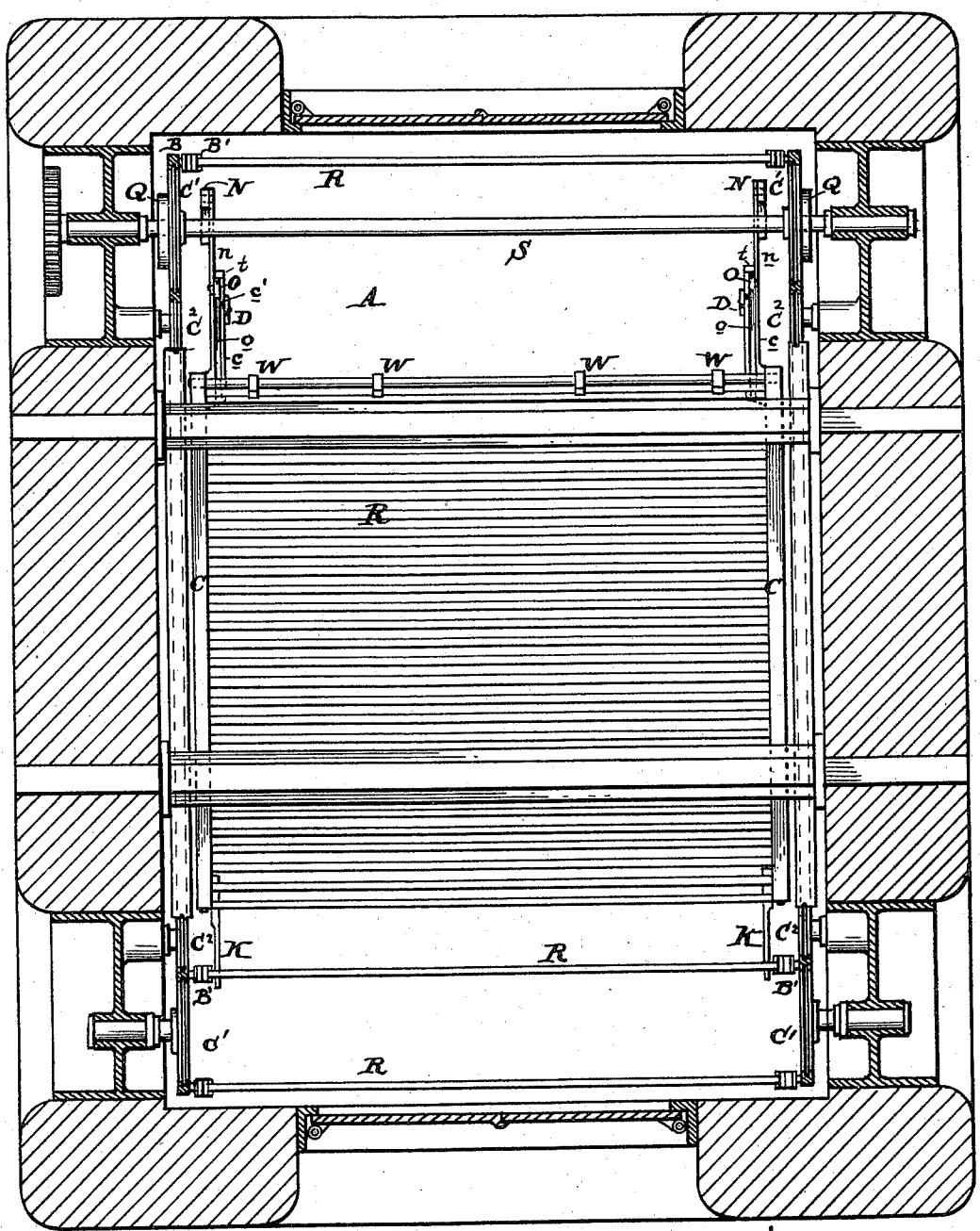

Figure 1 is a sectional elevation of a steaming apparatus embodying my improvements, and Fig. 2 is a plan view of same.

A is the steaming-chamber and may be heated by steam, hot air, or by any other well-known means.

A' are feeding-rollers, between which the fabric is fed into the chamber, and $A^2$ is a discharge-passage for the withdrawal of the fabric.

B are two endless conveyers or chains and are guided over rollers C', $C^2$, $C^3$, and $C^4$, and these conveyers are provided at wide intervals with pivoted transferring-hooks B', the function of which is to transfer the supporting-rods R from the discharge end of the guides C to the feeding end thereof. These endless chains or conveyers are caused to make U-shaped bends at the top by the wheels or rollers C' $C^2$ and at the bottom are guided by the rollers $C^3$ and $C^4$, the latter being secured upon the free ends of radial beams $C^5$, so as to be free to rise and fall and thereby take up slack in the conveyers. The conveyers are put into motion by a power-shaft S, to which are secured two of the wheels or rollers C'. The feeding ends of the guides C are each provided with a horizontal support c, and the discharge end is provided with oblique and downwardly-extending guide-extensions K, hooked at their lower ends to form a pocket for receiving the supporting-bars R in a position to be taken up by the transferring-hooks. The support c is provided with an upward extension or shoulder c' and a pivoted dog D, which, acting in connection with the shoulder c', forms a recess or notch into which the supporting-rod may be received upon the descent of the transferring-hook. When deposited upon this support, the rod will remain there until pushed over the dog toward the guide C. To move the rods in this manner, I provide a rock-shaft M, having secured to it the arms N.

To the upper ends of the arms N are hinged pusher-rods n, having at their free ends rollers O, which run in suitable guide-grooves o in the support c. The rollers O may be dispensed with, if desired. These arms N are drawn backward by a spring H until arrested by a stop t. They are moved forward against the action of the spring by the eccentric Q and eccentric-rod P, the latter being connected with the arm N by means of a pin m on the arm, extending through a slot p on the eccentric-rod.

The power-shaft S may be operated in any suitable manner to rotate the eccentric at stated intervals.

It will be observed that a considerable portion of the revolution of the eccentric takes place without moving the arms N, thus giving a period of rest to the pusher n O. The remaining action of the eccentric operates to move the pusher so as to move a rod R forward into the guide C and across the descending fabric T. The return movement of the pusher is made by the spring H. When the rod is pushed forward, it presses against all of the series of rods in the guides C and moves them forward a short distance, discharging the one at the discharge end into the extension K and causing the new rod to move under the gravity-actuated locking-pawls W, which securely lock the rod from returning.

Any other form of locking or retaining device may be used in lieu of that shown.

The shoulder $c'$ may be omitted, as its function may be performed by the pusher-rollers O.

The rods R may have collars $r$ at their ends to facilitate their movement.

While an eccentric is a most satisfactory form of cam device for operating the pusher device, I do not confine myself to any special specific construction of cam for this purpose.

The operation of my invention will now be understood. The apparatus being as shown, the fabric to be treated will hang in loops from the rods in the guides C. When the incoming fabric descends sufficiently to form a new loop, the pushers are moved forward by the eccentrics and a new rod R is rolled into position under the clamps W, and thereby causes the fabric to begin to form a new loop. About this time the transferring-hooks have brought a new rod R into position and deposit it upon the supports $c$ immediately upon the return of the pusher. When the new rod is pushed under the clamps W, all of the rods in the guides C are moved forward and the last one runs down into the pockets and to a position adapted to insure its being taken up by the transferring-hooks, which then transfer the rod to the feeding end to be acted upon once more by the pusher. The fabric is drawn out of the discharge-passage $A^2$ at the same speed that it enters the chamber, so that when the apparatus is working at its full capacity there is the same amount of fabric under treatment at all times.

I do not confine myself to any special form of conveyer devices, as these may be varied to suit the designer. It is also evident that the pusher may be operated without the use of the slot $p$, but in that case the movement of the pusher would be greater. While I prefer the construction shown, I do not limit myself to the details thereof, as they may be modified without departing from my invention.

What I claim as new, and desire to secure by Letters Patent, is—

1. In apparatus for steaming, aging and drying fabrics, the combination of a closed chamber, conveyers provided with transferring-hooks, guides for the conveyers, rod-guides at the top of the chamber, a series of transverse cloth-supporting rods, a reciprocating pusher device to push the rods from the support into the rod-guides, and cam devices for operating the pusher devices.

2. In apparatus for steaming, aging and drying fabrics, the combination of a closed chamber, conveyers provided with transferring-hooks, guides for the conveyers, rod-guides at the top of the chamber, a series of transverse cloth-supporting rods, a support for the rods at the feeding end of the rod-guides, a reciprocating pusher device to push the rods from the support into the rod-guides, cam devices for operating the pusher devices, and a loose slotted connection $m\ p$ between the cam and pusher devices to secure an intermittent action of the pusher devices.

3. In apparatus for steaming, aging and drying fabrics, the combination of a closed chamber, conveyers provided with transferring-hooks, guides for the conveyers, rod-guides at the top of the chamber, a series of transverse cloth-supporting rods, a support for the rods at the feeding end of the rod-guides, a pivoted dog on the rod-supports to hold the rod in position, a reciprocating pusher device to push the rods from the support into the rod-guides, and cam devices for operating the pushing devices.

4. In apparatus for steaming, aging and drying fabrics, the combination of a closed chamber, conveyers provided with transferring-hooks, guides for the conveyers, rod-guides at the top of the chamber, a series of transverse cloth-supporting rods, a support for the rods at the feeding end of the rod-guides, a reciprocating pusher device to push the rods from the support into the rod-guides, cam devices for operating the pusher devices, and receiving-pockets for the rods at the discharging end of the rod-guides.

5. In apparatus for steaming, aging and drying fabrics, the combination of a closed chamber, conveyers provided with transferring-hooks, guides for the conveyers, rod-guides at the top of the chamber, a series of transverse cloth-supporting rods, a reciprocating pusher device to push the rods from the support into the rod-guides, cam devices for operating the pusher devices, and receiving-pockets for the rods at the discharging end of the rod-guides.

6. In apparatus for steaming, aging and drying fabrics, the combination of a closed chamber, conveyers provided with transferring hooks, guides for the conveyers, rod-guides at the top of the chamber, a series of transverse cloth-supporting rods, a support for the rods at the feeding end of the rod-guides, a reciprocating pusher device to push the rods from the support into the rod-guides, cam devices for operating the pusher devices, a loose slotted connection $m\ p$ between the cam and pusher devices to secure an intermittent action of the pusher devices, and a pivoted dog on the rod-supports to hold the rod in position.

7. In apparatus for steaming, aging and drying fabrics, the combination of a closed chamber, conveyers provided with transferring-hooks, guides for the conveyers, rod-guides at the top of the chamber, a series of transverse cloth-supporting rods, a support for the rods at the feeding end of the rod-guides, a horizontal reciprocating part or pusher for pushing the rods over the rod-supports, and cam devices for operating the pusher.

8. In apparatus for steaming, aging and drying fabrics, the combination of a closed chamber, conveyers provided with transferring-hooks, guides for the conveyers, rod-guides at the top of the chamber, a series of transverse cloth-supporting rods, a support for the rods at the feeding end of the rod-guides, a horizontal reciprocating part or pusher for pushing the rods over the rod-supports, means for temporarily holding the rods in position on the supports so as to be in line with the movement of the pusher, and cam devices for operating the pusher.

9. A feeding device for the transverse rods of a steaming, aging and drying apparatus, consisting of the combination of a support for the rods, a reciprocating pusher device to push the rods from the support into the rod-guides, and cam devices for operating the pusher devices.

10. A feeding device for the transverse rods of a steaming, aging and drying apparatus, consisting of the combination of a support for the rods, a reciprocating pusher device to push the rods from the support into the rod-guides, cam devices for operating the pusher devices, and a loose slotted connection $m\ p$ between the cam and pusher devices to secure an intermittent action of the pusher devices.

11. In apparatus for steaming, aging and drying fabrics the combination of a closed chamber, supporting transverse rods for supporting the fabric in loops, rod-guides, means for transferring the rods from the discharge end to the feeding end of the rod-guides, a pivoted pusher for automatically feeding the rods through the rod-guide, and a cam device for operating the pusher.

12. In apparatus for steaming, aging and drying fabrics, the combination of a closed chamber, supporting transverse rods for supporting the fabric in loops, rod-guides, means for transferring the rods from the discharge end to the feeding end of the rod-guides, a pivoted pusher for automatically feeding the rods through the rod-guide, a cam device for operating the pusher in one direction, and a spring to move it in the other direction.

13. In apparatus for steaming, aging and drying fabrics, the combination of a closed chamber, supporting transverse rods for supporting the fabric in loops, rod-guides, means for transferring the rods from the discharge end to the feeding end of the rod-guides, a pivoted pusher for automatically feeding the rods through the rod-guide, a cam device for operating the pusher in one direction, a spring to move it in the other direction, and a loose slotted connection $m\ p$ between the cam and pusher devices to secure an intermittent action of the pusher devices.

In testimony of which invention I hereunto set my hand.

R. M. HUNTER.

Witnesses:
R. M. KELLY,
WM. L. EVANS.